(Model.)
W. E. CASE.
ART OF CONVERTING CHEMICAL ENERGY INTO ELECTRICAL ENERGY.
No. 368,190. Patented Aug. 16, 1887.
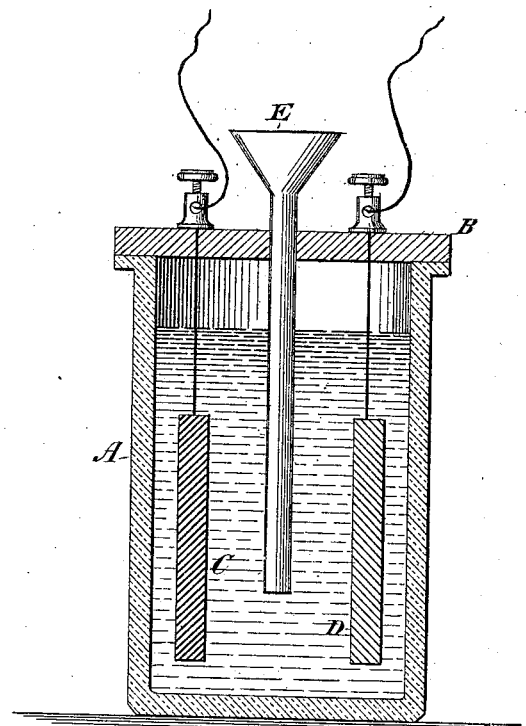
WITNESSES:
Gustave Dieterich
Edgar Goodwin
INVENTOR
Willard E. Case
BY Park Benjamin
his ATTORNEY

United States Patent Office.

WILLARD E. CASE, OF AUBURN, NEW YORK.

ART OF CONVERTING CHEMICAL ENERGY INTO ELECTRICAL ENERGY.

SPECIFICATION forming part of Letters Patent No. 368,190, dated August 16, 1887.

Application filed April 20, 1887. Serial No. 235,466. (Model.)

*To all whom it may concern:*

Be it known that I, WILLARD E. CASE, of Auburn, Cayuga county, New York, have invented a new and useful Improvement in the Art of Converting Chemical Energy into Electrical Energy, of which the following is a specification.

The principle of my improvement in the art of converting chemical energy into electrical energy consists in producing an electrical current by chemically attacking carbon without imparting heat to said carbon or to the cell from any extraneous source. I carry this principle into practical effect in a galvanic cell in which there is an electrolyte and two elements, one of which is of carbon. The carbon is the attacked element, and its consumption results in and bears a ratio to the production of electrical energy in a circuit which includes the said elements and electrolytes.

In the term "carbon," as herein used, I include, first, native free carbon in all its forms in which it is a conductor of electricity; second, free carbon reduced from the various carbonaceous (or caboniferous) compounds which may be decomposed to afford free carbon, and, third, carbon compounds which are reducible to afford free carbon. In stating, therefore, that my invention depends upon chemically attacking carbon in the galvanic cell without the application of extraneous heat, I wish it understood that the term "carbon," especially as employed in the claims herein, includes, in the broad and generic sense, any form of carbon or carbon compound, as above indicated, and that I exclude only such forms of carbon as may be non-conductive of electricity. I do not, however, exclude carbonaceous bodies which prior to their reduction as above will not conduct electricity, but which after reduction as above will conduct electricity, because the effect of the electrolyte employed may be first to effect the reduction of the carbon compound.

My aforesaid improvement in the art is susceptible of being applied in many modes and by the use of many forms of apparatus. Therefore I describe one mode and apparatus whereby my said improvement can be applied with beneficial result, and I do declare that by following the description hereinafter set forth my said improvement in the art may be exhibited and performed in actual experience.

My improvement in the art consists in placing a body of carbon in a conducting medium and subjecting it to the action of a substance containing oxygen in unstable combination. By "unstable combination" I mean held by weak bonds of chemical affinity, for as carbon at ordinary temperatures has an exceedingly weak chemical affinity for oxygen it will only overcome the existing affinities of the most unstable chemical compounds for the purpose of combining with the oxygen which they may contain. In said conducting medium is also a conducting body of a substance which will either not be attacked by said oxygen when liberated or will be attacked thereby in less degree than is the carbon. The two elements aforesaid and the conducting medium being joined in circuit, an electrical current is caused.

The substance containing oxygen in unstable combination may or may not enter into the constitution of the electrolyte—that is, it may be formed directly in the electrolyte, or it may be produced outside of the cell and introduced into the conducting medium and into contact with the carbon.

The substance containing oxygen in unstable combination which I prefer to employ is known as "peroxide of chlorine." Other oxides of chlorine may be employed; but I have thus far secured the best results with that above mentioned. This substance is chemically represented by the symbol $ClO_2$, and may be obtained by the reaction of sulphuric acid and chlorate of potash. It is a gas gradually decomposable into its elements by exposure to light, and it is explosive at a temperature of about 140° Fahrenheit. It is a most powerful oxidizer.

The accompanying drawing represents the general arrangement of the cell.

A is a containing-vessel, of any suitable material, provided with a closely-fitting cover, B. In this cell I place a quantity of sulphuric acid.

C is an element of carbon, and D an element of platinum.

E is a feeding-tube passing down into the acid.

The cell as thus far described gives no current, or substantially none, owing to the small difference of potential between the carbon and the platinum in the presence of the acid. By means of the feeding-tube E, for convenience, I drop into the acid a few crystals of chlorate of potash. A well-known reaction occurs, the crystals becoming red and a reddish-yellow hue pervading the acid. A current then appears in a conductor joining the carbon and platinum elements. This current I have found to attain an electro-motive force of 1.25 volt by actual experiment. The attack upon the carbon is apparent, and the platinum is substantially unattacked.

I am aware that electric currents have hitherto been produced by the union of carbon and oxygen; but I am not aware that any means has been discovered prior to my present invention by which such union can be effected except at high temperature, which involves great waste of energy in the form of heat.

In another application for Letters Patent simultaneously filed herewith by me, Serial No. 235,468, I have fully described and claimed the apparatus herein set forth and the specific process of attacking carbon in said apparatus by an unstable oxygen compound therein generated; and in still another application for Letters Patent simultaneously filed herewith by me, Serial No. 235,467, I have fully described and claimed other apparatus and specific process of attacking carbon in the same by an unstable oxygen compound in gaseous state generated outside the cell. The subject-matter specifically claimed in the aforesaid applications I do not herein claim.

I claim—

1. The improvement in the art of converting chemical energy into electrical energy, which consists in chemically attacking carbon in a galvanic cell without the application of heat.

2. The improvement in the art of converting chemical energy into electrical energy, which consists in causing the oxidation of carbon in a galvanic cell without the application of heat.

3. The improvement in the art of converting chemical energy into electrical energy, which consists in subjecting carbon to the action of an unstable oxygen compound in a galvanic cell without the application of heat.

4. The improvement in the art of converting chemical energy into electrical energy, which consists in subjecting carbon in a galvanic cell to the action of an unstable oxygen compound formed in the electrolyte in said cell without the application of heat, substantially as described.

5. The improvement in the art of converting chemical energy into electrical energy, which consists in subjecting carbon in a galvanic cell to the action of an unstable oxygen compound in solution in a liquid electrolyte in said cell without the application of heat, substantially as described.

WILLARD E. CASE.

Witnesses:
GEORGE UNDERWOOD,
FREDERICK I. ALLEN.